United States Patent
Hochmuth et al.

(10) Patent No.: US 9,529,800 B2
(45) Date of Patent: Dec. 27, 2016

(54) DISPLAYING CLUSTERS OF MEDIA ITEMS ON A MAP USING REPRESENTATIVE MEDIA ITEMS

(71) Applicant: Facebook, Inc., Menlo Park, CA (US)

(72) Inventors: Gregor Hochmuth, San Francisco, CA (US); Tim Van Damme, San Francisco, CA (US); Philip McAllister, San Francisco, CA (US); Kevin Systrom, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 57 days.

(21) Appl. No.: 14/699,948

(22) Filed: Apr. 29, 2015

(65) Prior Publication Data
US 2015/0234818 A1    Aug. 20, 2015

Related U.S. Application Data

(63) Continuation of application No. 13/759,927, filed on Feb. 5, 2013, now Pat. No. 9,047,847.

(51) Int. Cl.
| | |
|---|---|
| *G06T 11/60* | (2006.01) |
| *G06F 17/30* | (2006.01) |
| *G06K 9/46* | (2006.01) |
| *G06K 9/62* | (2006.01) |
| *G06K 9/52* | (2006.01) |
| *G06K 9/00* | (2006.01) |

(52) U.S. Cl.
CPC ... *G06F 17/30017* (2013.01); *G06F 17/30241* (2013.01); *G06F 17/30598* (2013.01); *G06F 17/30864* (2013.01); *G06K 9/00476* (2013.01); *G06K 9/46* (2013.01); *G06K 9/52* (2013.01); *G06K 9/6218* (2013.01); *G06T 11/60* (2013.01); *G06K 2009/4666* (2013.01)

(58) Field of Classification Search
CPC ...................................................... G06T 11/60
See application file for complete search history.

(56) References Cited

U.S. PATENT DOCUMENTS 8,660,358 B1 *  2/2014  Bergboer ........... G06K 9/00677
                                                        345/629

* cited by examiner

*Primary Examiner* — Jeffery A Brier
(74) *Attorney, Agent, or Firm* — Van Pelt, Yi & James LLP (57) ABSTRACT

Displaying media items on a map includes: determining, among a plurality of media items, a set of media items that belongs to a region on a map, including: selecting, among the plurality of media items, a representative media item of the set of media items; defining the region on the map, a size of the region being dependent at least in part on a size of a reduced resolution image associated with the representative media item; and determining one or more other media items whose corresponding one or more pixel locations on a display are within the region, and including the one or more other media items in the set of media items; and displaying the reduced resolution image of the representative media item in the region on the map to represent the set of media items.

20 Claims, 9 Drawing Sheets

| ID | Geocode | Thumbnail |
|---|---|---|
| 1 | 37.0804954, -122.403395 (San Francisco) |  |
| 2 | 37.0806275, -122.408968 (San Francisco) |  |
| 3 | 34.077566, -188.474621 (Los Angeles) |  |
| 4 | 29.703225, -95.402956 (Houston) |  |
| 5 | 40.643601, -73.782207 (New York City) |  |
| 6 | 29.703275, -95.402950 (Houston) |  |
| ... | ... | ... |

DISPLAYING CLUSTERS OF MEDIA ITEMS ON A MAP USING REPRESENTATIVE MEDIA ITEMS

CROSS REFERENCE TO OTHER APPLICATIONS

This application is a continuation of co-pending U.S. patent application Ser. No. 13/759,927, entitled DISPLAYING CLUSTERS OF MEDIA ITEMS ON A MAP USING REPRESENTATIVE MEDIA ITEMS filed Feb. 5, 2013 which is incorporated herein by reference for all purposes.

BACKGROUND

Smartphones and cameras with built-in Global Positioning System (GPS) have the capability to associate geotags with photos taken on these devices. A geotag includes latitude and longitude coordinates of a location (typically the location where the photo is taken or imported into the device), as well as other optional information such as altitude and bearing. Users of photo management applications often want to organize photos using geotag information. Some existing photo applications show the locations of the photos on a map using icons such as pins. The images of the photos, however, are typically not displayed in the map because it can be difficult to display a large number of photos on a screen with limited size. Accordingly, the user would select a pin to view the photos themselves. Since existing map view features of photo viewing applications typically display the icons on a large scale (e.g., on a world map), the results offer relatively little insight into locations of interest to the users. Further, the interactions can be so cumbersome for the users that they may be deterred from using the map view feature at all.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Displaying media items on a map is disclosed. In some embodiments, media items (e.g., images (including photos and illustrations), videos, etc.) are grouped into clusters that correspond to different regions. Representative media items are selected from the clusters and displayed on the map without overlapping with each other. When the user zooms in the map, the existing clusters are regrouped into new clusters, and representative media items are selected from the new clusters and displayed on the zoomed map without overlapping with each other. The display of representative media items provides a more intuitive and user friendly way of organizing media items. Although images or photos are discussed for purposes of illustration, the technique described herein is also applicable to other media items such as videos.

Figure 1:
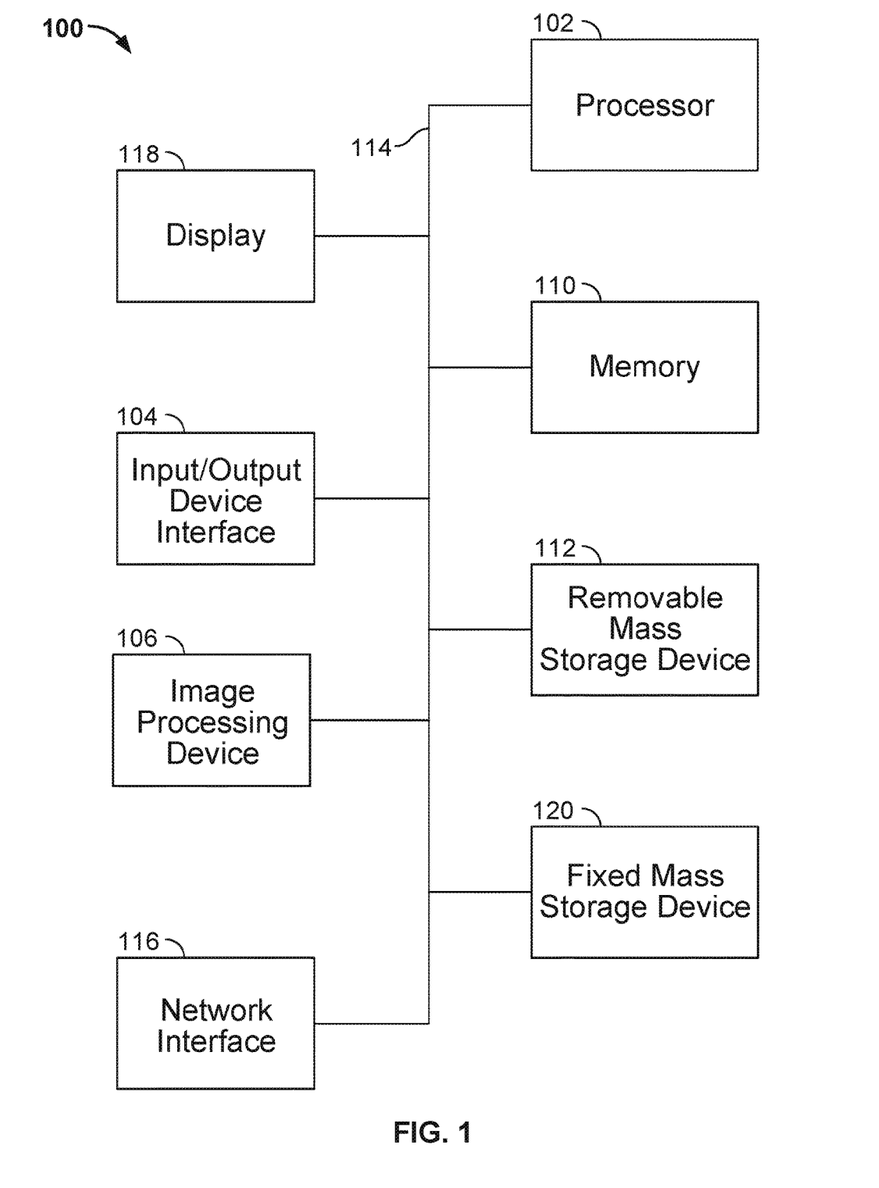
FIG. 1 is a functional diagram illustrating a programmed computer system for displaying media items in accordance with some embodiments.

FIG. 1 is a functional diagram illustrating a programmed computer system for displaying media items in accordance with some embodiments. As will be apparent, other computer system architectures and configurations can be used to perform the described media item display technique. Computer system 100, which includes various subsystems as described below, includes at least one microprocessor subsystem (also referred to as a processor or a central processing unit (CPU) 102). For example, processor 102 can be implemented by a single-chip processor or by multiple processors. In some embodiments, processor 102 is a general purpose digital processor that controls the operation of the computer system 100. In some embodiments, processor 102 also includes one or more coprocessors or special purpose processors (e.g., a graphics processor, a network processor, etc.). Using instructions retrieved from memory 110, processor 102 controls the reception and manipulation of input data received on an input device (e.g., image processing device 106, I/O device interface 104), and the output and display of data on output devices (e.g., display 118).

Processor 102 is coupled bi-directionally with memory 110, which can include, for example, one or more random access memories (RAM) and/or one or more read-only memories (ROM). As is well known in the art, memory 110 can be used as a general storage area, a temporary (e.g., scratch pad) memory, and/or a cache memory. Memory 110 can also be used to store input data and processed data, as well as to store programming instructions and data, in the form of data objects and text objects, in addition to other data and instructions for processes operating on processor 102. Also as is well known in the art, memory 110 typically includes basic operating instructions, program code, data, and objects used by the processor 102 to perform its functions (e.g., programmed instructions). For example, memory 110 can include any suitable computer readable storage media described below, depending on whether, for example, data access needs to be bi-directional or uni-directional. For example, processor 102 can also directly and very rapidly retrieve and store frequently needed data in a cache memory included in memory 110.

A removable mass storage device 112 provides additional data storage capacity for the computer system 100, and is optionally coupled either bi-directionally (read/write) or uni-directionally (read only) to processor 102. A fixed mass storage 120 can also, for example, provide additional data storage capacity. For example, storage devices 112 and/or 120 can include computer readable media such as magnetic tape, flash memory, PC-CARDS, portable mass storage devices such as hard drives (e.g., magnetic, optical, or solid state drives), holographic storage devices, and other storage devices. Mass storages 112 and/or 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can be used to provide access to other subsystems and devices as well. As shown, these can include a display 118, a network interface 116, an input/output (I/O) device interface 104, an image processing device 106, as well as other subsystems and devices. For example, image processing device 106 can include a camera, a scanner, etc.; I/O device interface 104 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interfaces for interacting with system 100. Multiple I/O device interfaces can be used in conjunction with computer system 100. The I/O device interface can include general and customized interfaces that allow the processor 102 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 116 allows processor 102 to be coupled to another computer, computer network, or telecommunications network using a network connection as shown. For example, through the network interface 116, the processor 102 can receive information (e.g., data objects or program instructions) from another network, or output information to another network in the course of performing method/process steps. Information, often represented as a sequence of instructions to be executed on a processor can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 104 and display 118 share the touch sensitive screen component, which both detect user inputs and display outputs to the user). In addition, bus 114 is illustrative of any interconnection scheme serving to link the subsystems. Other computer architectures having different configurations of subsystems can also be utilized.

Figure 2:
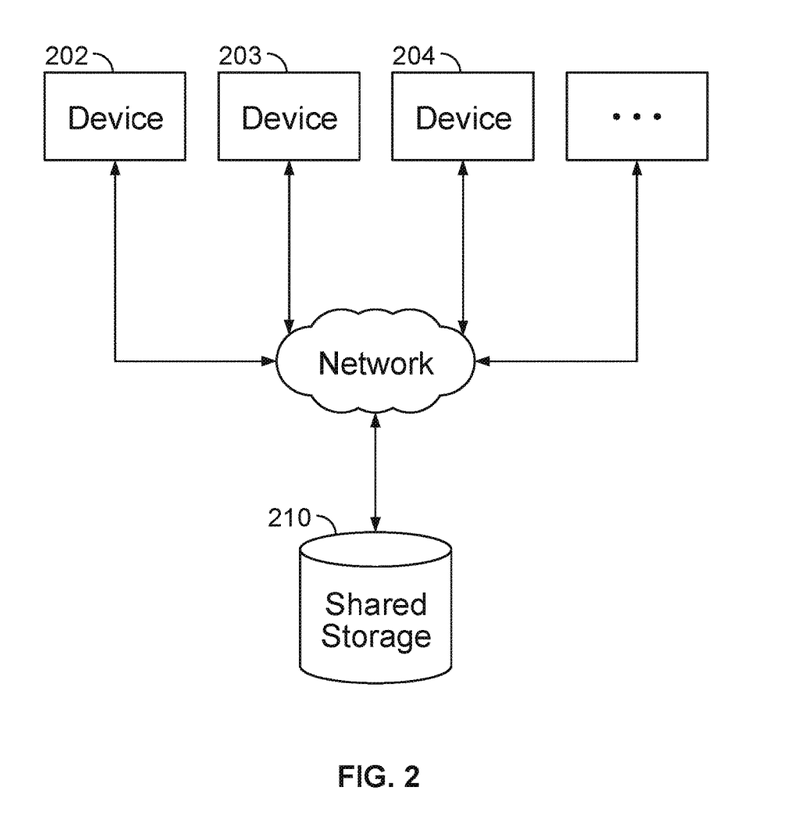
FIG. 2 is a system diagram illustrating an embodiment of a platform for sharing media items among users.

Using a device such as 100, a user can obtain media items stored locally and/or from a networked source, and view the items on a map. FIG. 2 is a system diagram illustrating an embodiment of a platform for sharing media items among users. In this example, client devices such as 202, 203, 204, etc. are connected to a network. Using a client application (e.g., a stand-alone application or a browser-based application) installed on a client device, a user has the ability to choose and share certain media items with other users using other devices via the network. In some embodiments, media items are stored locally on the devices, which exchange and share content using a peer-to-peer protocol. In some embodiments, users use their devices to upload shared media items to a shared storage device 210 (which can be implemented using one or more servers or databases) and exchange the shared data via the shared storage device.

In some embodiments, a media item includes the original media object/file (e.g., the original image object/file) and associated metadata information, such as geocode information associated with the location of the media item. Optionally, one or more reduced resolution images (e.g., thumbnails) derived based on the original media object/file is also included as a part of the media item.

Figure 3:
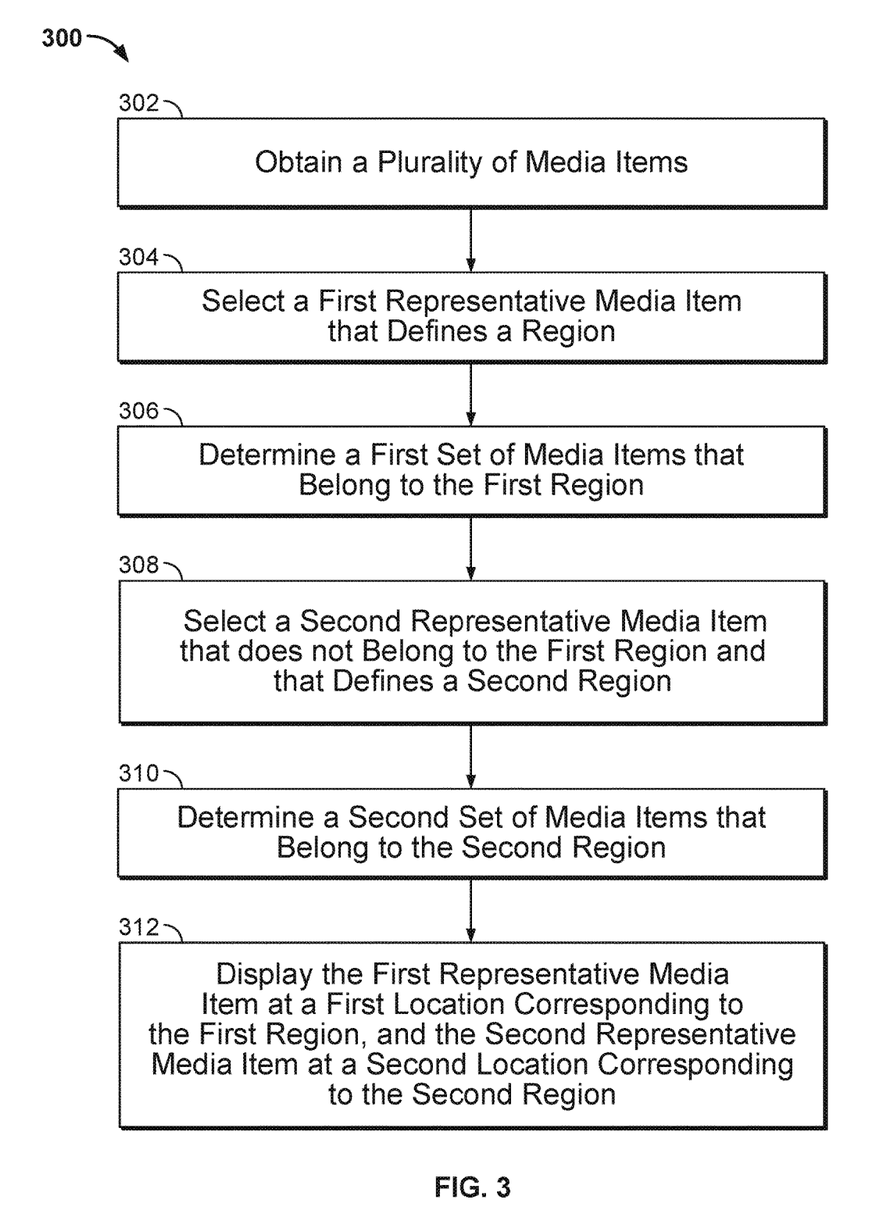
FIG. 3 is a flowchart illustrating an embodiment of a process for displaying media items on a map.

FIG. 3 is a flowchart illustrating an embodiment of a process for displaying media items on a map. Process 300 can be implemented on a device such as 100 of FIG. 1. Process 300 can be invoked in response to a user activation of a photo map tool, a user request to zoom or adjust an existing photo map view, or other appropriate user actions.

At 302, a plurality of media items is obtained. In some embodiments, process 300 is invoked to view a collection of photos by a specific user, and the plurality of media items is obtained from its storage location. The media items can be stored on the device locally and be directly accessed (as in the case of a user viewing a photomap of his own photo collection on his smartphone/smart camera), or be stored on another device or data storage device and be accessed via a network (as in the case of a user viewing a photomap of photos by another user). As will be discussed in greater detail below, when process 300 is invoked in response to a zoom action, the plurality of media items is obtained based on the zoomed region. In various embodiments, a media item includes the original media object/file, and optionally one or more reduced resolution images (e.g., thumbnails) derived based on the original media object/file, as well as metadata information pertaining to the media object/file, such as geocode information.

A geocode, in particular the coordinates associated with a media item, can be translated into a pixel location on the display screen by invoking an Application Programming Interfaces (API) call provided by the operating system or a programming library, such as Map Kit for Apple's iOS™, Google Maps for Android™, etc. Similarly, a geographical area can also be translated into a region on the screen. In some embodiments, the geocode is obtained directly from the client device (e.g., using a mobile device's GPS system when the media item is generated). In some embodiments, geocode is obtained from a third party such as a social networking system. For example, when the user performs a "check-in" action on Facebook® and obtains a media item in association with the "check-in" action, the geocode associated with the location at which the user performs the "check-in" is determined by the system.

At 304, a first representative media item that defines a region is selected. In various embodiments, the first representative media item can correspond to the most recently acquired media item among the plurality of media items (e.g., the photo that was most recently taken), the most popular media item (e.g., the photo that was most viewed by other users or received the most comments or likes from other users), the most surrounded media item (e.g., the media item that has the highest number of adjacent media items within a predefined distance), the most relevant media item (e.g., the photo that was determined to be most interesting to the user based on the user's actions such as the number of times the user has shared the photo with others on a social networking system), or the like. In some embodiments, the media items are sorted according to the selection criteria (e.g., time, popularity, number of adjacent items, etc.) and the first item in the sorted list is determined to be the first representative media item. In some embodiments, the region is defined as a bounding box centered at the first representative media item's corresponding pixel location, having a predefined size and shape (e.g., a square that is 60 pixels on each side). Regions of various sizes or shapes can be used in various embodiments. As will be described in greater detail below, the size of the region depends at least in part on the size of the thumbnail image of the media item, and is defined in such a way to ensure that representative media items are displayed on the map in a non-overlapping fashion.

At 306, a first set (also referred to as cluster) of media items that belong to the first region is determined. In other words, a first set of media items whose corresponding pixel locations fall within the bounding box of the first region is determined. In some embodiments, all the remaining media items in the plurality of media items are compared with the bounding box to determine whether they belong to the first region.

At 308, a second representative media item is selected. The second representative media item does not belong to the first region, and defines a second region. In some embodiments, the second representative media item is selected among media items that were deemed not to belong to the first region. Similar to the selection of the first representative media item, the selection of the second representative media item is also based on one or more criteria such as time, popularity, number of adjacent items, etc. The second representative media item defines a second region (e.g., a bounding box centered at the second media item's corresponding pixel location).

At 310, a second set (or cluster) of media items that belong to the second region is determined. In particular, a second cluster of media items whose corresponding pixel locations fall within the bounding box of the second region is determined.

At 312, the first set of media items and the second set of media items are displayed, using a display device, such as 118 of FIG. 1, on the map. Initially, instead of displaying all the items individually, the first representative media item is displayed at a first location corresponding to the first region, and the second representative media item is displayed by displaying its corresponding thumbnail image at a second display location corresponding to the second region. In some embodiments, the corresponding thumbnail or reduced resolution images of the first representative media item are displayed.

In some embodiments, the order of the steps in the process can be rearranged. For example, step 310 can be performed prior to step 308, and step 306 can be performed prior to step 304. In some embodiments, some steps can be repeated. For example, 308-310 can be repeated for any remaining media items that are not included in the previously determined clusters to form additional sets that belong to additional regions. The steps can be repeated until a property associated with the remaining media items exceeds a threshold, for example, until the number of remaining media items is at or below a certain threshold (e.g., 4 media items) or until all the remaining media items are within a certain distance or area (e.g., a bounding box that covers the remaining media items is less than 500 meters in one dimension).

Figure 4:
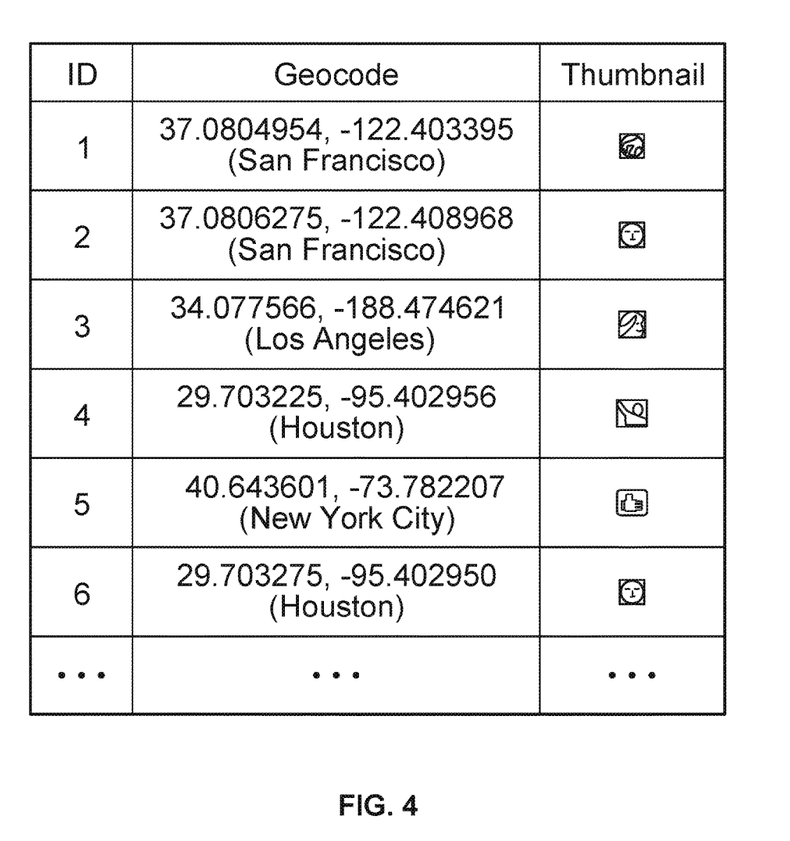
FIG. 4 illustrates an example of a list of media items to be displayed.
Figure 5:
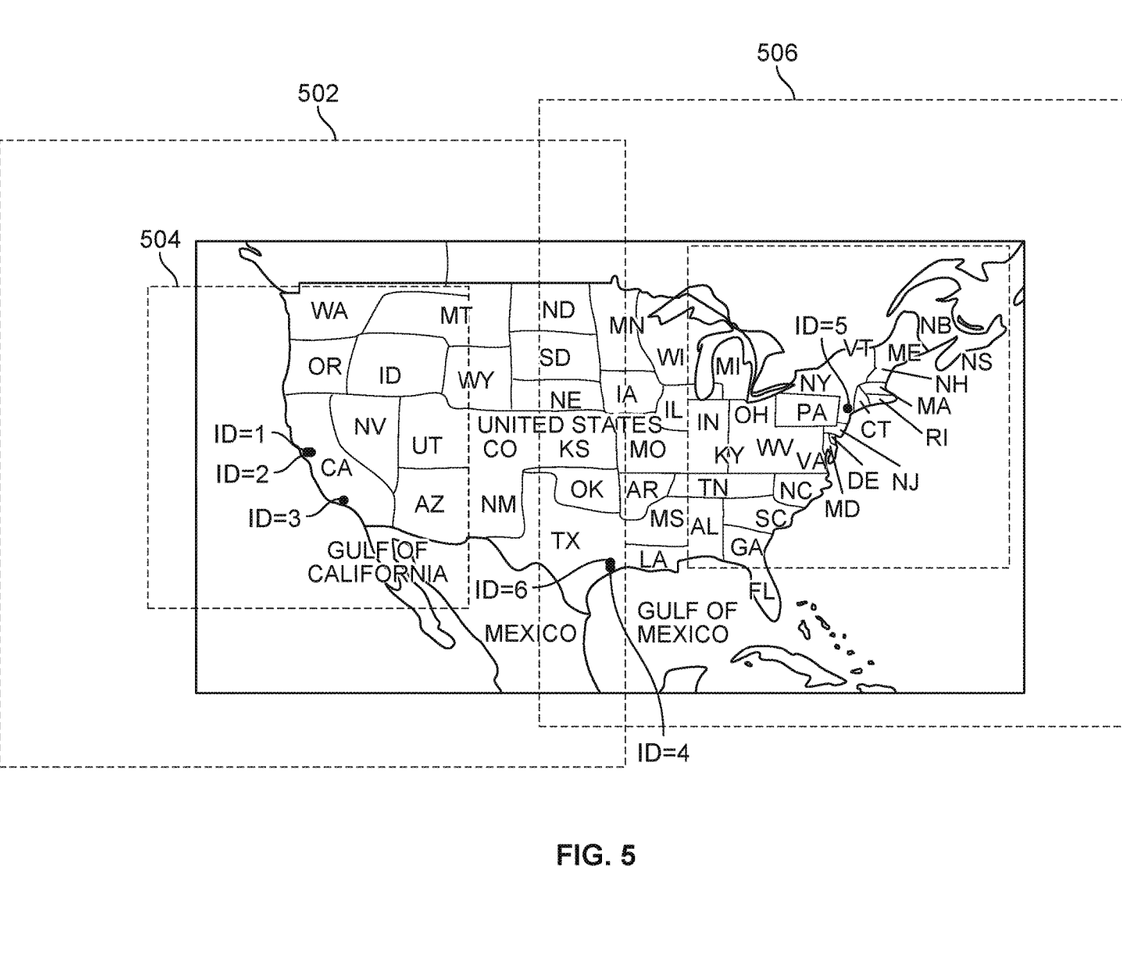
FIG. 5 is a diagram illustrating an example of clustering the list of media items of FIG. 4 on a map.

The following example illustrates process 300 in detail. FIG. 4 illustrates an example of a list of media items to be displayed. The items in the list are sorted according to their associated timestamps, with the most recent item listed first. Each item is represented using an identifier, a geocode, and a thumbnail. Additional information such as the full sized original object/file can be included as well. The first representative media item is the item with the ID of 1. Referring to FIG. 5, as shown on a map, the first media item (ID=1) defines a first region 502 according to 304 of process 300. In this case, the first region 502 corresponds to a square that is 60 pixels wide on each side. This is because the thumbnail image to be displayed in association with this region occupies a center square area 504 that is 30 pixels wide on each side, and a buffer region of 15 pixels is kept on each side to avoid any overlap of the thumbnail image with thumbnail images associated with other regions. The second, third, and fourth media items (ID=2, 3, and 4) from the list all fall within region 502, according to 306 of process 300. As such, these items are deemed to belong to the first region. The fifth media item (ID=5), however, is outside region 502. The fifth media item becomes the second representative media item that defines a second region 506, according to 308 of process 300.

In some embodiments, once the first region is defined, all the media items in the list are examined to determine whether they belong to the first region, according to 306 of process 300. The second representative media item is selected among the remaining media items that do not belong to the first region, according to 308 of process 300, and the remaining media items are examined to determine whether they belong to the second region, according to 310 of process 300. The process is repeated until all the media items are clustered or a property of the remaining media items meets a threshold (e.g., a threshold number of 4 items, a threshold maximum distance between media items of 500 meters). In such an implementation, both the fourth media item (ID 4) and the sixth media item (ID 6) would be deemed to belong to region 502, and subsequently the fifth media item (ID 5) would be deemed to not belong to region 502 and cause a new region 506 to be created.

In some embodiments, media items in the list are processed one by one sequentially to determine to which existing region each media item belongs. In the example shown in FIGS. 4-5, the fourth media item (ID 4) is deemed to belong to region 502 (306 of process 300) because at the time the fourth media item is evaluated, only a single region 502 has been defined, and region 506 would not be defined until the fifth media item is processed. The sixth media item (ID 6), however, is deemed to belong to region 506 (310 of process 300). This is because at the time the sixth media item is evaluated, both regions 502 and 506 have been defined, and the sixth media item is deemed to be closer to the center of region 506. In some embodiments, the initial cluster configuration is cached, and each additional media item (e.g., a new photo added by the user) is processed by comparing with all existing regions to identify the closest one for association.

In some embodiments, to determine which one of the multiple regions a media item belongs, the pixel distances of the media item relative to the centers of the regions are compared first. The media item is deemed to belong to the region corresponding to the shorter pixel distance. Since the distance of a pixel on screen can correspond to a large geographical distance, in the event that there is a tie of the pixel distances, the geographical distances of the media item relative to the centers of the regions are computed and compared, and the media item is deemed to belong to the region corresponding to the shorter geographical distance. In the example of FIG. 5, although the sixth media item (ID 6) is equal distance with respect to the centers of the two regions in terms of pixel distance, it is actually closer to the center of region 506 in terms of geographical distance. In some embodiments, only the geographical distance is computed.

In some embodiments, a quadtree data structure in which each internal node has four children is used to store information about the media items and facilitate the clustering process. The quadtree partitions the map space by recursively dividing it into four quadrants or regions. The media items are stored as nodes in the quadtree according to their respective locations. The representation of the media items' locations on a map in a quadtree allows for quick access of items in a particular region on the map, and offers good performance for queries/lookups. For example, when a cluster of photos centered in San Francisco area is operated on (e.g., in response to a zoom-in operation), the quadtree implementation filters out photos outside the area (e.g., ignoring photos on the East Coast, in Europe, and in Asia), thus making any queries/lookups to the cluster of interest more efficient.

Figure 6:
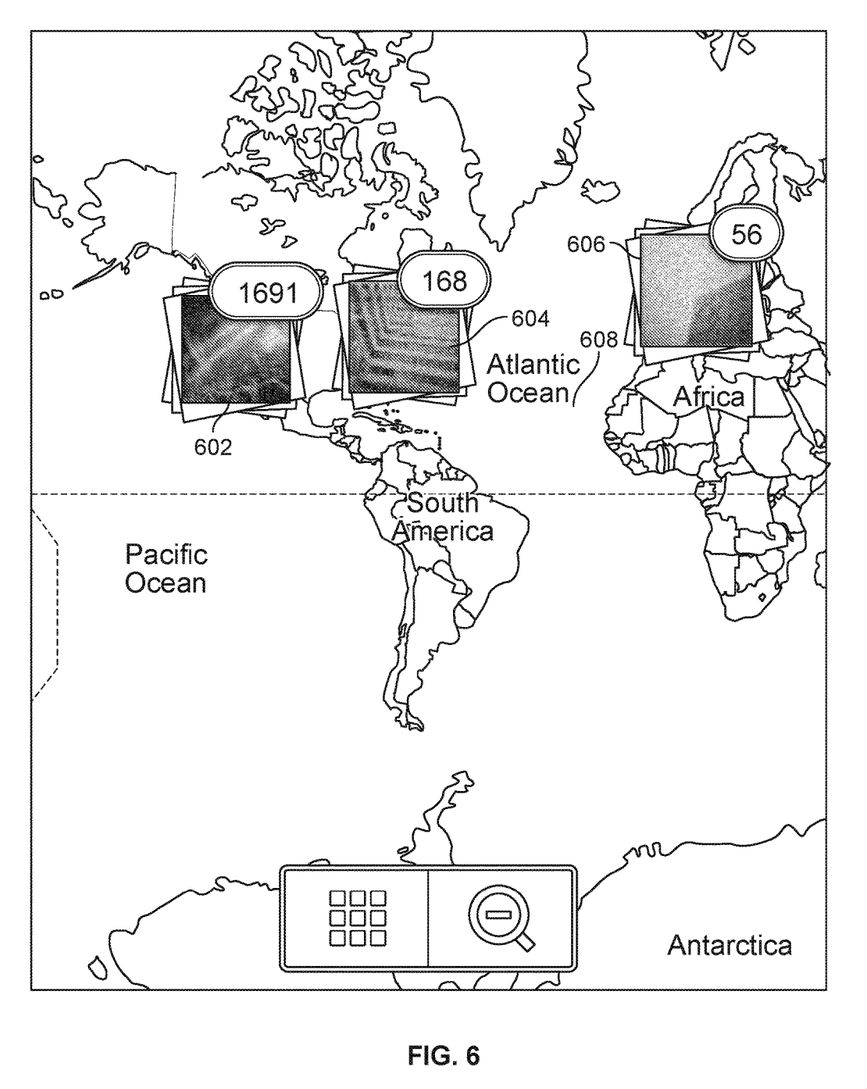
FIG. 6 is a map view illustrating an example of clustered media items.

FIG. 6 is a map view illustrating an example of clustered media items. In the example shown, a user's collection of photos is processed according to process 300 and displayed on a world map. In the example shown, the user's photo collection forms three clusters: cluster 602 on the West Coast of the United States, 604 on the East Coast of the United States, and 606 in Western Europe. A representative photo for each of the three clusters is displayed, along with the number of photos in each cluster. The clusters are formed in such a way that the representative photos do not overlap on the map.

As shown, a representative photo for each cluster is overlaid on a world map to form the initial view. In various embodiments, the center of the map can correspond to the center of the cluster with the highest number of items, a geometric center of the cluster centers, a weighted geometric center of the cluster centers (e.g., center pixel locations of the clusters are assigned a weight that is proportional to the number of photos in the cluster, and a geometric center is determined on the weights), or any other appropriate center location.

In some embodiments, the resulting clustered and centered map view is displayed directly to the user. In some embodiments, the map view is displayed in an animated fashion, where the view pans from an original world map (which can be the same for each user) to the centered map view (which can be different for different users).

In some embodiments, the user has various options to change the view of the map by zooming (in or out) or shifting the current map view. In response to a request to change the view, a new bounding area is determined according to the request, and a current plurality of media items within the bounding area is determined. The current plurality of media items are reclustered and displayed according to a process such as 300.

For example, a user has the option to zoom in to view a higher scale map (i.e., a zoomed map where a unit distance on the map corresponds to a shorter geographical distance). In various embodiments, the application supports a variety of user interactions to invoke a zoom-in action, including: double clicking the map or single clicking a cluster with a pointing device; double tapping the map or spreading two fingers across the map on a touch sensitive screen; single tapping a cluster on a touch sensitive screen, etc. The photos are regrouped to form new clusters that fit within the zoomed map area.

Figure 7:
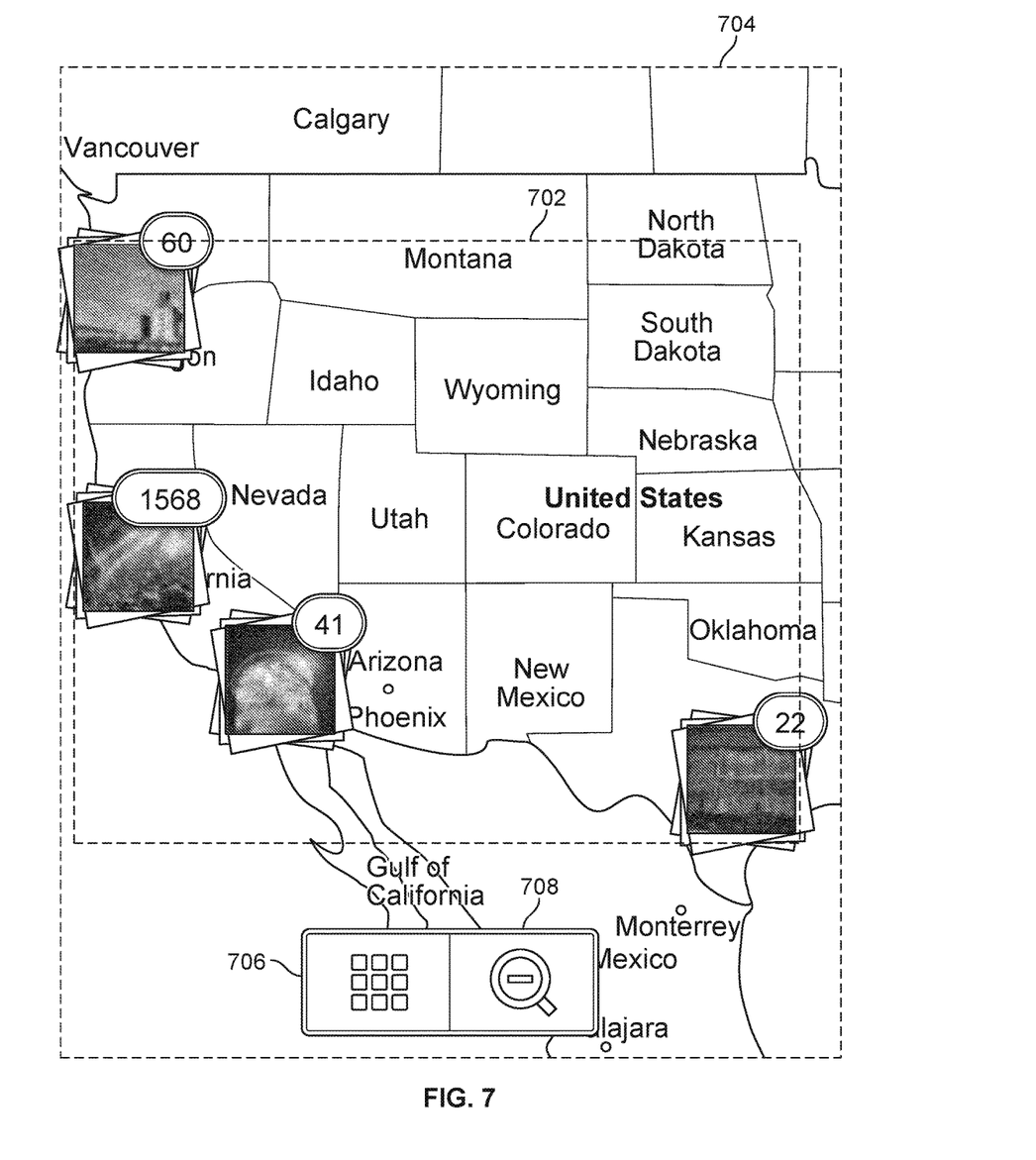
FIG. 7 is a diagram illustrating an example of a zoomed view with regrouped clusters.

Referring to the example shown in FIG. 6, when the user single taps or single clicks on a cluster such as 602 to get a zoomed view of the cluster, the zoomed area is dependent on an area defined by the images in the cluster. FIG. 7 is a diagram illustrating an example of a zoomed view with regrouped clusters. In this example, a bounding box 702 is determined by the furthest north, east, south, and west locations associated with the photos in cluster 602. Other bounding region shapes such as a circle that encompasses all the items can be used. The map API is queried to provide the smallest map area 704 that both encompasses the bounding box and fills the available screen area. In this example, photos in cluster 602 are obtained as the set of media items to be reclustered according to process 300 to generate new clusters that can be represented by non-overlapping images. Although certain items in cluster 602 may be geographically closer to cluster 604, the reclustering process maintains and reclusters the same set of items in cluster 602 to make the result appear consistent to the user. For example, the same sum of photos in the new clusters would be equal to the number of photos in cluster 602. Representative image items are selected for the new clusters, and the resulting zoomed view is shown in FIG. 7.

Figure 8:
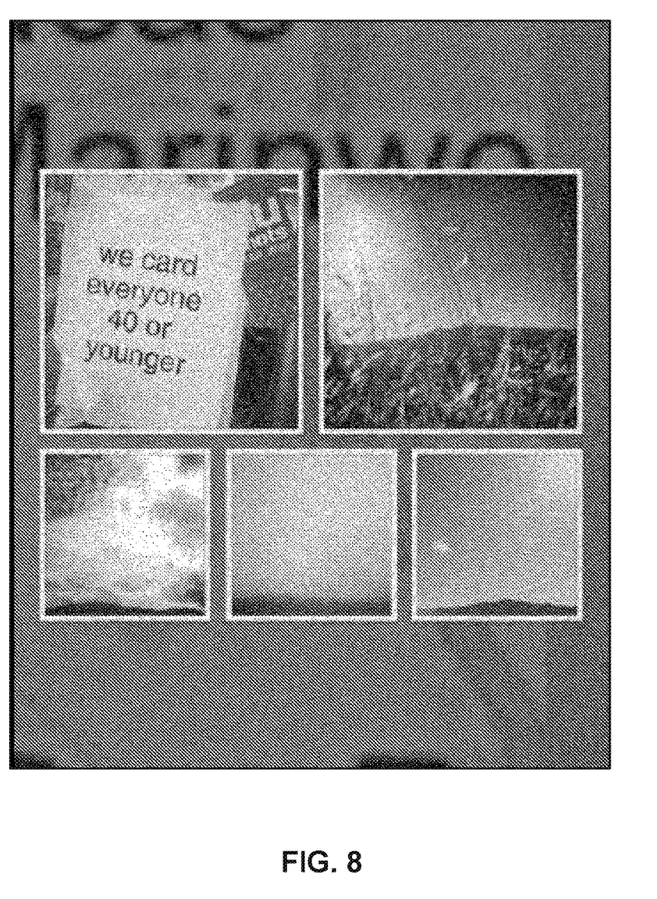
FIG. 8 is a diagram illustrating a display of photos in a cluster at the last level of zoom.

The user can continue to zoom in further into the map by selecting (e.g., tapping or clicking) an individual cluster on the map, until a property of the media items in the cluster reaches a threshold. Various properties can be used in different embodiments. In some embodiments, no further zoom is permitted and images (full or reduced resolution) are displayed to the user once the number of photos in the cluster has reached some threshold (e.g., a threshold number of 4 photos), once all the photos in the cluster are no more than a threshold distance apart (e.g., a threshold distance of 500 meters), once a bounding box that covers all the photos in the cluster is below a threshold size (e.g., a threshold size of 500 meters in one dimension), etc. FIG. 8 is a diagram illustrating a display of photos in a cluster at the last level of zoom. Reduced resolution images of the photos in the cluster are laid out on the screen in a list view, and the user can selectively view an individual media item at a higher resolution by tapping or clicking on the reduced resolution image. In some embodiments, when a cluster cannot be further zoomed and in anticipation of further user selection, images (e.g., reduced resolution photos) associated with the media items in the cluster are prestored in a buffer, so that the images can be displayed quickly should the user choose to view details of the cluster.

Figure 9:
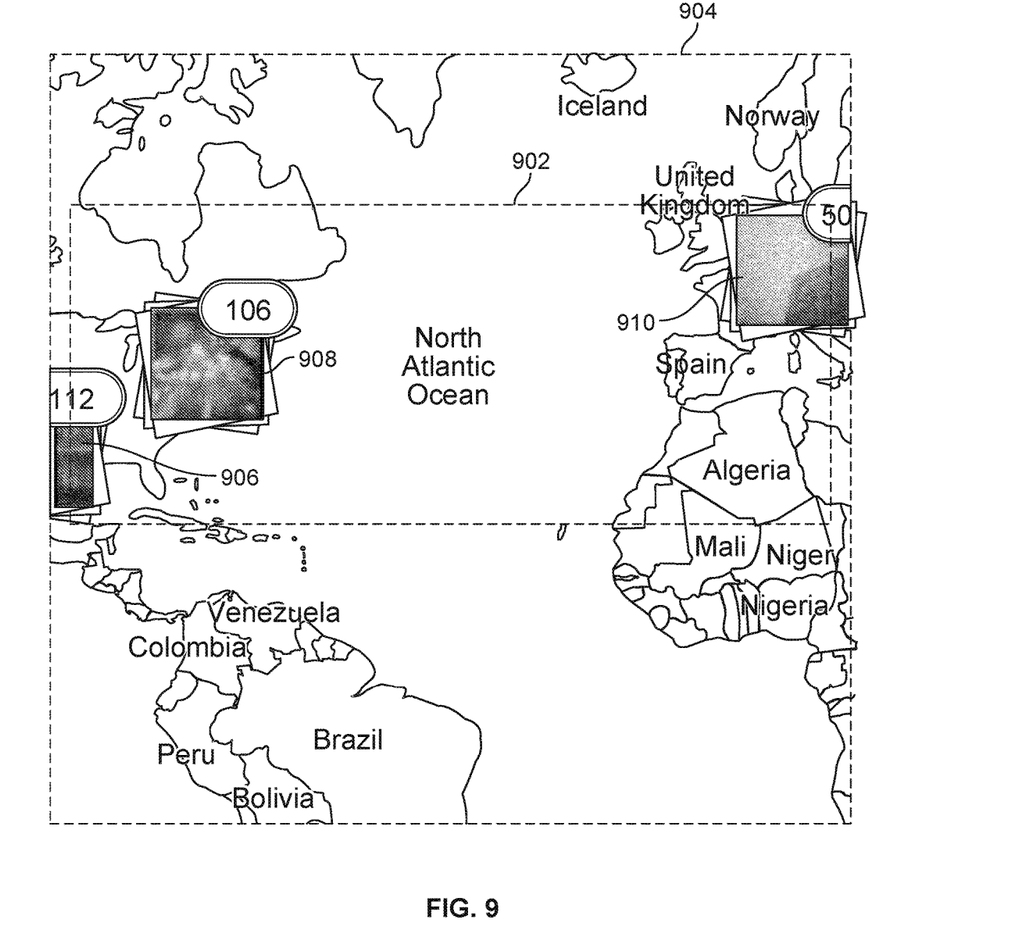
FIG. 9 is a diagram illustrating another example of a zoomed view with regrouped clusters.

In some embodiments, different ways to invoke the zoom yield different zoomed map areas and correspondingly different new clusters in the zoomed view. FIG. 9 is a diagram illustrating another example of a zoomed view with regrouped clusters. Referring again to the example shown in FIG. 6, when the user double taps or double clicks at location 608, or spreads two fingers across the screen starting with the initial location at 608, the zoomed-in map view of FIG. 9 results. In this example, a map API call provided by the operating system or a programming library is invoked in response to the zoom request. The API call determines map area 904 resulting from the zoom, and a bounding box 902 is determined based on the furthest north, east, south, and west locations associated with photos in map area 904. Photos assigned to clusters 604 and 606 as well as any other photos that were previously assigned to another cluster such as 602 but falls within the bounding box are obtained and reclustered according to process 300, forming new clusters 906, 908, and 910.

The user also has the option to zoom out or shift the map view. In various embodiments, the application supports a variety of user interactions to invoke a zoom-out action, including by clicking/tapping on a zoom-out tool (e.g., 708 of FIG. 7), or pinching two fingers together across the map on a touch sensitive screen. The application also supports a variety of user interactions to shift the map, including by swiping a finger across the map on a touch sensitive screen, dragging the map using a cursor, etc. Similar to the zoom-in process described, the map API call is invoked in response to a zoom-out or shift action. A resulting zoomed-out (or shifted) map area, a corresponding bounding box, and a set of photos included in the bounding box are determined. Photos located in the zoomed-out (or shifted) map area are identified, reclustered, and displayed according to process 300.

In some embodiments, the resulting photo map in response to a zoom-in (or zoom-out) or shift request is displayed in an animated fashion. The starting state of the animation corresponds to the initial photo map view, and the ending state of the animation corresponds to the resulting changed photo map with new clusters of photos. As soon as the request is received, the reclustering process begins, and computations are carried out in parallel with the display of the zoomed-in (or zoomed-out) map image. Once the new clusters are determined, the representative photos associated with the new clusters are displayed in such a way that the new clusters appear to be splitting from the old clusters if zooming-in, or merging together with the old clusters if zooming out.

Further, in some embodiments, the user is given the capability to view the photos directly and bypass multiple levels of zoom, by for example double clicking or double tapping on a cluster, or selecting a list view tool that is provided by the application as a shortcut (e.g., 706 of FIG. 7). When a cluster is double clicked or double tapped, photos in the cluster are displayed in a list view similar to that of FIG. 8. When the list view tool is invoked, photos in the current view are displayed in a list. In both cases, the list view displays reduced resolution images of a limited number of the most recent (or most popular or otherwise most likely to be viewed) photos on the screen initially. The user can scroll through to view additional photos, select a specific image to view in greater detail or to perform related actions such as commenting, forwarding, etc.

Displaying media items on a map has been disclosed. Photo maps that display non-overlapping representative media items for multiple clusters and recluster based on view changes offer a more intuitive and efficient way of managing and viewing photos.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining, among a plurality of media items, a set of media items that belongs to a region on a map, including:
   selecting, among the plurality of media items, a representative media item of the set of media items;
   defining the region on the map, a size of the region being dependent at least in part on a size of a reduced resolution image associated with the representative media item; and
   determining one or more other media items whose corresponding one or more pixel locations on a display are within the region, and including the one or more other media items in the set of media items; and
   displaying the reduced resolution image of the representative media item in the region on the map to represent the set of media items.

2. The method of claim 1, further comprising sorting the plurality of media items according to a criteria, wherein the representative media item is selected among the sorted plurality of media items.

3. The method of claim 1, further comprising sorting the plurality of media items according to a criteria, wherein:
the representative media item is selected among the sorted plurality of media items; and
the criteria includes time, popularity, or number of adjacent items.

4. The method of claim 1, wherein the region has a predefined size and shape.

5. The method of claim 1, wherein a dimension of the region is determined based on a number of pixels of a dimension of the reduced resolution image and a number of pixels in a buffer region.

6. The method of claim 1, wherein:
the region is a first region, the set of media items is a first set of media items, and the representative media item is a first representative media item; and
the method further comprises:
selecting, among the plurality of media items, a second set of media items that belongs to a second region on the map, the second region being a non-overlapping region on the map with respect to the first region, the selecting of the second set of media items including:
determining a second representative media item of the second set of media items, the second representative media item not belonging to the first region;
defining the second region on the map, a size of the second region being dependent at least in part on a size of a reduced resolution image associated with the second representative media item; and
determining one or more other media items whose corresponding one or more pixel locations are within the second region, and including the one or more other media items in the second set of media items; and
displaying the reduced resolution image of the second representative media item in the second region on the map to represent the second set of media items.

7. The method of claim 1, further comprising:
determining, among remaining media items not included in any determined sets of media items, an additional set of media items that belongs to an additional regions on the map; and
displaying on the map reduced resolution images of representative media items of determined sets of media items, wherein the reduced resolution images are displayed without overlapping with one another.

8. The method of claim 7, further comprising repeating the determination of one or more additional sets of media items until a property associated with remaining media items not included in any set of media items exceeds a threshold.

9. The method of claim 8, further comprising determining, for a given media item, a specific one of the determined regions to which the given media item belongs, the determination being based at least in part on pixel distances of the given media item relative to centers of the determined regions.

10. A system, comprising:
one or more processors to:
determine, among a plurality of media items, a set of media items that belongs to a region on a map, including to:
select, among the plurality of media items, a representative media item of the set of media items;
define the region on the map, a size of the region being dependent at least in part on a size of a reduced resolution image associated with the representative media item; and
determine one or more other media items whose corresponding one or more pixel locations on a display are within the region, and include the one or more other media items in the set of media items; and
cause the reduced resolution image of the representative media item in the region to be displayed on the map to represent the set of media items; and
a memory coupled to the one or more processors to provide the one or more processors with instructions.

11. The system of claim 10, the one or more processors are further to sort the plurality of media items according to a criteria, wherein the representative media item is selected among the sorted plurality of media items.

12. The system of claim 10, the one or more processors are further to sort the plurality of media items according to a criteria, wherein:
the representative media item is selected among the sorted plurality of media items; and
the criteria includes time, popularity, or number of adjacent items.

13. The system of claim 10, wherein the region has a predefined size and shape.

14. The system of claim 10, wherein a dimension of the region is determined based on a number of pixels of a dimension of the reduced resolution image and a number of pixels in a buffer region.

15. The system of claim 10, wherein:
the region is a first region, the set of media items is a first set of media items, and the representative media item is a first representative media item; and
the one or more processors are further to:
select, among the plurality of media items, a second set of media items that belongs to a second region on the map, the second region being a non-overlapping region on the map with respect to the first region, the selecting of the second set of media items including to:
determine a second representative media item of the second set of media items, the second representative media item not belonging to the first region;
define the second region on the map, a size of the second region being dependent at least in part on a size of a reduced resolution image associated with the second representative media item; and
determine one or more other media items whose corresponding one or more pixel locations are within the second region, and including the one or more other media items in the second set of media items; and
display the reduced resolution image of the second representative media item in the second region on the map to represent the second set of media items.

16. The system of claim 10, the one or more processors are further to:
determine, among remaining media items not included in any determined sets of media items, an additional set of media items that belongs to an additional regions on the map; and
cause reduced resolution images of representative media items of determined sets of media items to be displayed on the map, wherein the reduced resolution images are displayed without overlapping with one another.

17. The system of claim 16, the one or more processors are further to repeat the determination of one or more additional sets of media items until a property associated with remaining media items not included in any set of media items exceeds a threshold.

18. The system of claim 17, the one or more processors are further to determine, for a given media item, a specific one of the determined regions to which the given media item belongs, the determination being based at least in part on pixel distances of the given media item relative to centers of the determined regions.

19. A computer program product, the computer program product being embodied in a tangible non-transitory computer readable storage medium and comprising computer instructions for:
    determining, among a plurality of media items, a set of media items that belongs to a region on a map, including:
        selecting, among the plurality of media items, a representative media item of the set of media items;
        defining the region on the map, a size of the region being dependent at least in part on a size of a reduced resolution image associated with the representative media item; and
        determining one or more other media items whose corresponding one or more pixel locations on a display are within the region, and including the one or more other media items in the set of media items; and
    displaying the reduced resolution image of the representative media item in the region on the map to represent the set of media items.

20. The computer program product of claim 19, the computer program product further comprising computer instructions for sorting the plurality of media items according to a criteria, wherein the representative media item is selected among the sorted plurality of media items.

* * * * *